Oct. 1, 1935.                V. T. WREN                2,016,130
             FREIGHT LOADING AND UNLOADING WINCH FOR VEHICLES
                 Filed Aug. 3, 1934          3 Sheets-Sheet 3
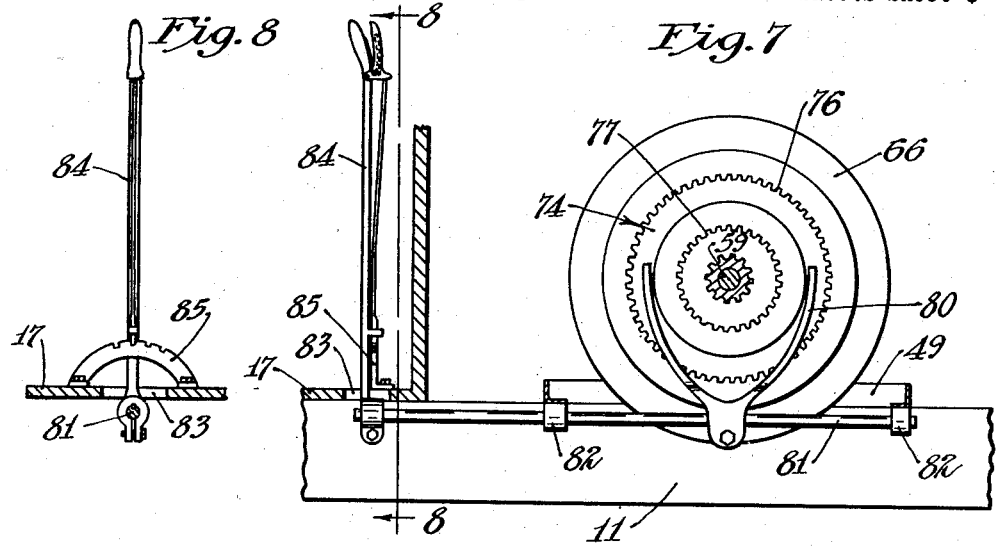
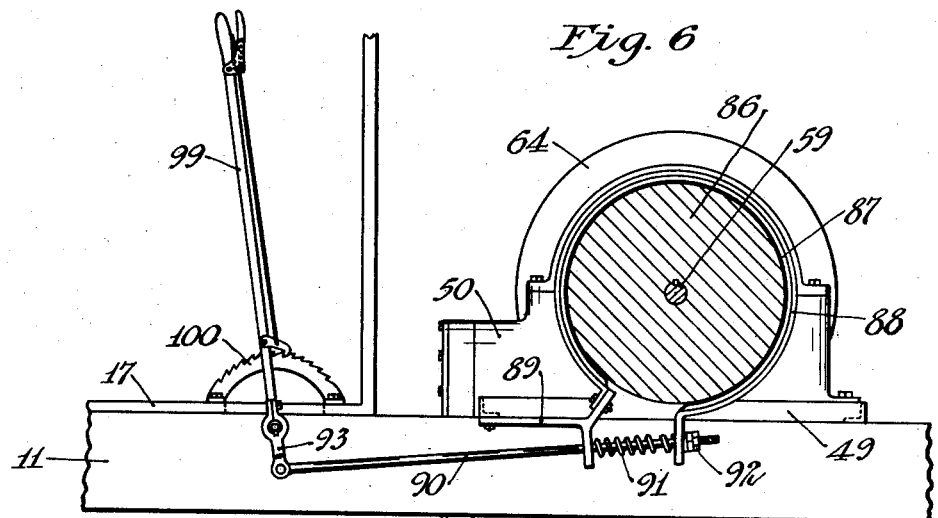
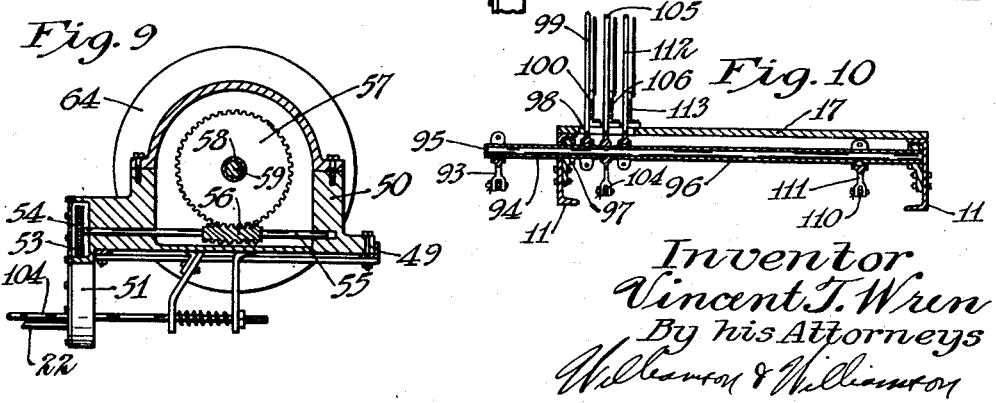
Inventor
Vincent T. Wren
By his Attorneys
Williamson & Williamson Patented Oct. 1, 1935

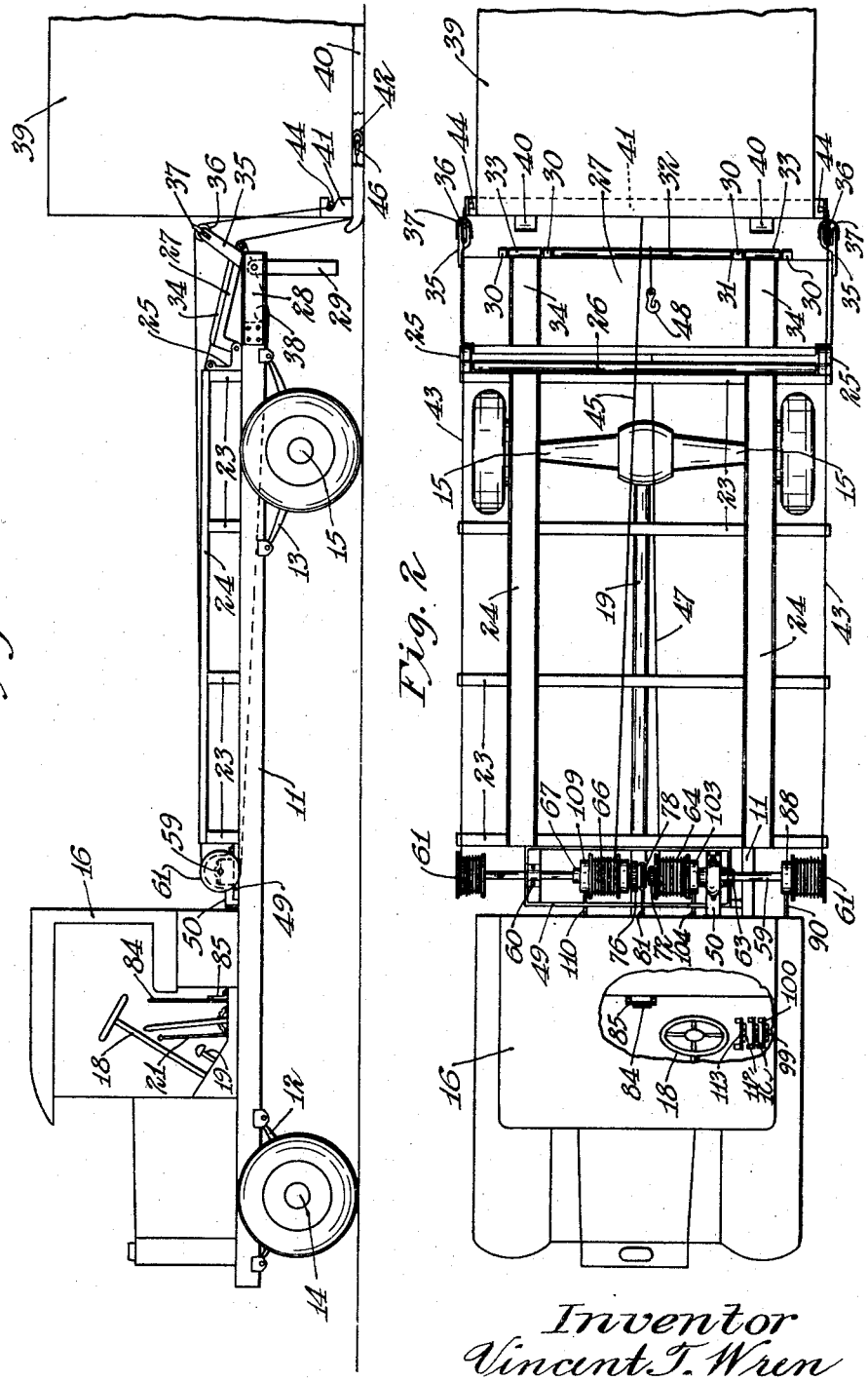
Oct. 1, 1935. V. T. WREN 2,016,130
FREIGHT LOADING AND UNLOADING WINCH FOR VEHICLES
Filed Aug. 3, 1934 3 Sheets-Sheet 1
Inventor
Vincent T. Wren
By his Attorneys
Williamson & Williamson

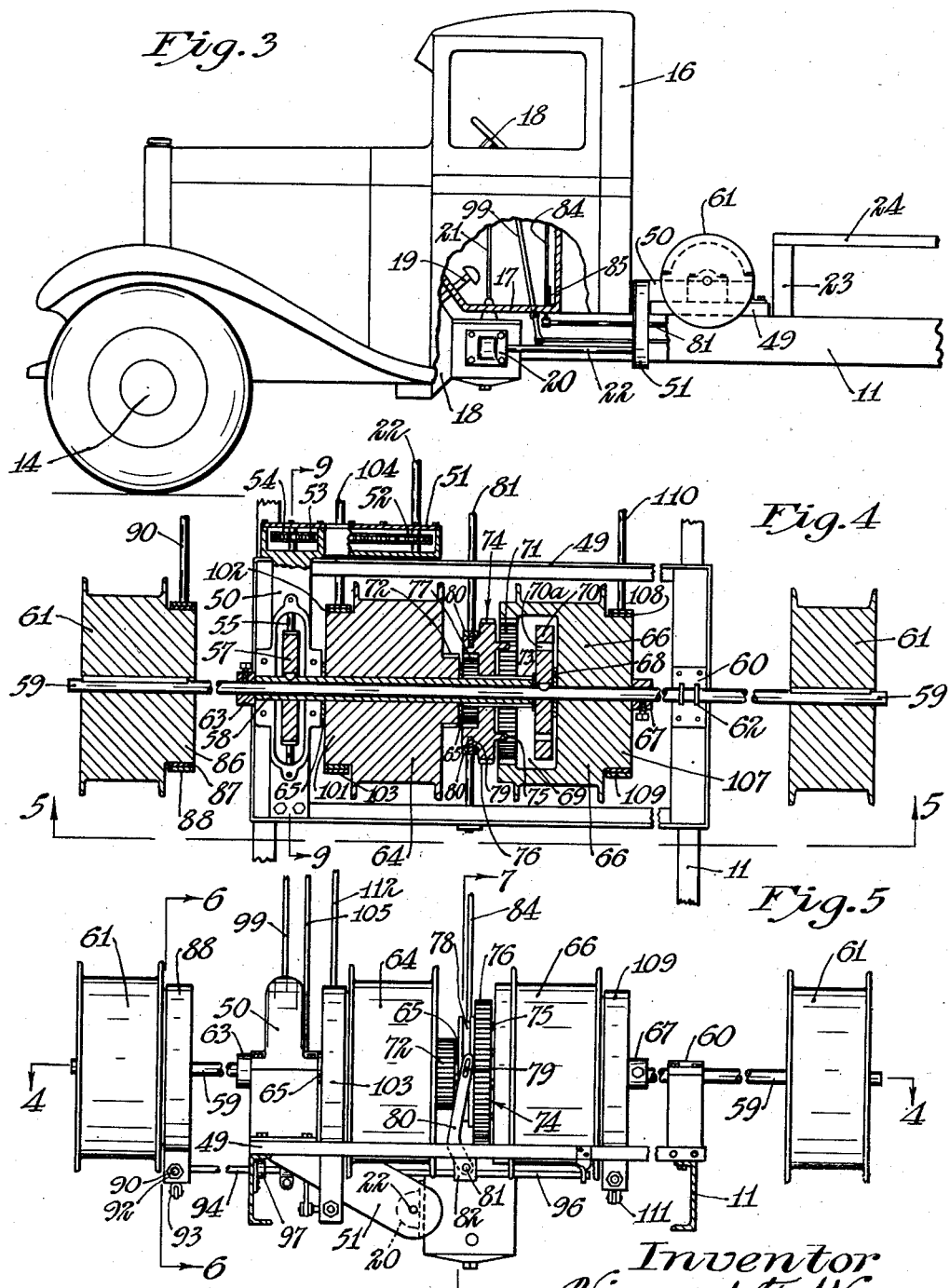

2,016,130

UNITED STATES PATENT OFFICE 2,016,130

FREIGHT LOADING AND UNLOADING WINCH FOR VEHICLES

Vincent T. Wren, Lakeville, Minn.

Application August 3, 1934, Serial No. 738,218

10 Claims. (Cl. 254—185)

This invention relates to power winches which, although adaptable for many uses, are particularly adaptable for use in connection with freight loading and unloading devices for vehicles.

It is one of the objects of this invention to provide a novel and improved triple action power winch of simple and inexpensive construction including three cable winding drums, each of which may be selectively independently driven from the same driving mechanism.

A more detailed object of the invention is to provide a novel power winch which can be effectively used in connection with my "Freight loading and unloading device for vehicles" disclosed in my co-pending application for patent so entitled, filed simultaneously herewith, Serial Number 738,217.

The objects and advantages of the invention will more fully appear from the following description, made in connection with the accompanying drawings, wherein like reference characters refer to the same or similar parts throughout the various views, and, in which, Fig. 1 is a view in side elevation illustrating a vehicle equipped with a freight loading and unloading device, my triple action winch being mounted on the vehicle;

Fig. 2 is a plan view of the vehicle shown in Fig. 1;

Fig. 3 is a view in side elevation in enlarged scale showing the front portion of the vehicle, portions of the cab being broken away and shown in section;

Fig. 4 is a horizontal section taken on the line 4—4 of Fig. 5, and illustrating parts of my winch, as indicated by the arrows;

Fig. 5 is a vertical section taken on the line 5—5 of Fig. 4, as indicated by the arrows;

Fig. 6 is a vertical section taken on the line 6—6 of Fig. 5, as indicated by the arrows;

Fig. 7 is a vertical section taken on the line 7—7 of Fig. 5, as indicated by the arrows;

Fig. 8 is a vertical section taken on the line 8—8 of Fig. 7, as indicated by the arrows;

Fig. 9 is a vertical section taken on the line 9—9 of Fig. 4, as indicated by the arrows; and Fig. 10 is a vertical transverse section taken through the floor boards of the cab and illustrating certain of the parts.

Referring to the drawings, there are illustrated certain portions of an ordinary truck chassis which include a chassis frame 11 supported by front springs 12 and rear springs 13 from a wheel equipped front axle 14 and a wheel equipped rear axle 15 respectively. The truck chassis is provided with the usual cab 16, the floor boards of which are designated by the numeral 17 and in the cab there is provided the usual steering wheel 18 and foot clutch lever 19 which controls the drive from the engine of the vehicle through the transmission 18 to the propeller shaft 19. An auxiliary transmission 20 operated by a gear shift lever 21 is provided and through this transmission the engine of the vehicle may operate a drive shaft 22 when the gear shift lever 21 is thrown to the proper position and the clutch of the vehicle operated from the clutch foot lever 19 is thrown in. The drive shaft 22 extends rearwardly from the auxiliary transmission 20.

In accordance with the invention disclosed in my above identified co-pending application, a number of cross sills 23 are connected to the side members of the chassis frame 11 and secured to the upper edges of these sills are a pair of longitudinally extending, spaced, parallel, channel-shaped tracks 24. Mounted on the rear cross sill 23 are a pair of heavy brackets 25 having upwardly projecting arms within which a roller 26 is journaled, the upper surface of this roller lying just above the intermediate webs of the tracks 24. The brackets 25 also have lower rearwardly extending arms to which a tail gate 27 is pivotally connected. This tail gate may be swung upwardly or downwardly and in its downward position it rests against a pair of bars 28 which project rearwardly from the rear ends of side members of the chassis frame 11. Props 29 are pivoted to the rear ends of the bars 28. Four brackets 30 are connected to the rear edge of the tail gate 27 and a shaft 31 is secured in these brackets and this shaft has mounted thereon a central sleeve roller 32 and two sleeve rollers 33, the latter two rollers being in line with the respective tracks 24. Channel-shaped tracks 34 mounted on the upper surface of the tail gate 27 are in longitudinal alinement with the tracks 24. Heavy arms 35 project upwardly and somewhat rearwardly from the rear end of the tail gate 27 and these arms have forked upper ends within which sheaves 36 are mounted and keepers 37 attached to the arms extend over the sheaves 36. Another roller 38 projecting somewhat below the bars 28 is journaled in brackets attached to the rear end of the frame 11. A freight carrier 39 is provided and this freight carrier has a pair of skids 40 attached to its bottom and extending longitudinally of the body, the said skids being spaced the same distance apart as the tracks 24 and tracks 34.

Hooks 41 are attached to the sides of the front end of the carrier 39 near its bottom and an eye 42 is centrally attached to the bottom of the carrier in spaced relation rearwardly somewhat from the forward end of the carrier.

A pair of cables 43 are provided and these cables run rearwardly from the forward part of the truck and normally extend over the sheaves 36 below the keepers 37 and they have attached at their rear ends cones 44 engageable with the hooks 41. Another cable 45 normally extends rearwardly from the front part of the truck over the rollers 26 and 32 and this cable has attached to its rear end a hook 46 engageable with the eye 42. Still another cable 47 normally extends rearwardly from the front part of the truck below roller 38 and over roller 32 and this cable carries at its rear end a hook 48 also engageable with the eye 42.

The present invention has to do with mechanism for operating the various cables 43, 45, and 47, or for operating independently any three cables mounted on the truck or elsewhere.

There is provided a suitable frame 49 attached preferably to the side members of the chassis frame 11 immediately behind the cab 16 and below the level of the tracks 24. This frame has attached thereto near one end thereof a gear housing 50 to the forward end of which is attached another gear housing 51 within which the rear end of the drive shaft 22 is journaled. The drive shaft 22 carries a sprocket 52 within housing 51 and a sprocket chain 53 runs over the sprocket 52 and over a sprocket 54 mounted at the forward end of a shaft 55 journaled in the housing 50, as best shown in Fig. 9. The shaft 55 carries a worm 56 meshed with a worm gear 57 disposed within housing 50 and fixed to a sleeve 58. Sleeve 58 is journaled at one end in the housing 50 and it projects for some little distance toward the opposite side of the truck from the side near which the housing 50 is located. A drum shaft 59 projects through the sleeve 58 and extends transversely of the truck from one side thereof to the other. This shaft is free for rotation relative to the sleeve 58 and it is journaled in a bearing 60 at the right end of frame 49, as viewed in Figs. 4 and 5. Fixed to the drum shaft 59 at its outer ends are two winding drums 61 to which the forward ends of the two cables 43 are respectively secured, forward portions of these members being normally wound on these drums. Shifting movement of the drum shaft 59 is prevented by means of flanges 62 received within the bearing 60 and a collar 63 attached to the shaft and bearing against the left side of the housing 50.

Journaled on the sleeve 58 to the right of the housing 50 is a winding drum 64 to which the forward end of the cable 47 is attached, forward portions of the cable being wound on this drum. Sliding movement of drum 64 relative to the sleeve 58 is prevented as by means of collars 65 attached to the sleeve. Another winding drum 66 is journaled on drum shaft 59 to the right of the right end of the sleeve 58, as viewed in the drawings, and the forward end of the cable 45 is attached to this drum and forward portions of the cable are normally wound on the drum. The drum 66 is restrained from sliding movement relative to shaft 59 by means of collars 67 and 68.

The left face of drum 66 is provided with a large recess 69 within which a clutch element 70 is received, this clutch element being interposed between the collar 68 and the right end of the sleeve 58 and being fixed to drum shaft 59. The clutch element 70 has openings 70a radially spaced from the center of the element and extending transversely through the same. To the left of the clutch element 70 the drum 66 is provided with a clutch element 71 formed as is an internal gear and the inner diameter of element 71 is somewhat greater than the diameter of the element 70. The drum 64 is provided with a clutch element 72 formed as is an external gear and this element 72 projects from the right side of drum 64 at the left of the right hand collar 65.

Splines 73 are provided on the portion of the sleeve 58 projecting to the right of the right hand collar 65 and slidably mounted on the splined portion of the sleeve is a master clutch member 74. This clutch member has on its right hand face projecting teeth forming a clutch element 75 for engagement with the clutch element 70 when the clutch member 74 is slid to its extreme right hand position. The master clutch member 74 has a peripheral external clutch element 76 formed thereon for engagement with the clutch element 71 when the clutch member 74 is slid somewhat to the right of the position shown in Fig. 4. The master clutch member 74 is recessed on its left face to form a clutch element 77 for engagement with the clutch element 72 when the clutch member 74 is slid to its extreme left hand position. The clutch member 74 is also provided to the left of the element 76 with a grooved shipper ring 78 within which the pins 79 of a shipper fork 80 are received. The shipper fork 80, as best shown in Fig. 7, is fixed to a shaft 81 journaled in bearings 82 projecting downwardly from frame 49 and the shaft 81 runs forwardly to a point below a slot 83 in the floor boards 17 of the cab. Attached to the forward end of the shaft 81 is a spring pressed dog equipped hand lever 84, the dog of which is adapted to be engaged within any one of four notches in a sector 85 secured to the floor boards 17. It will be observed that when the clutch member 74 is in the position shown in Fig. 4, none of the clutch elements of the clutch member will engage with the various clutch elements 70, 71, and 72. By swinging the lever 84, the clutch member 74 may be slid longitudinally of the sleeve 58 to selectively throw the respective clutch elements 75, 76 and 77 into engagement with the clutch elements 70, 71, and 72.

One of the winding drums 61, the left hand drum as viewed in the drawings, is provided with a brake drum 86 adapted to be engaged by a brake band 87 attached to a brake shoe 88 secured at one end to a bracket 89 attached to frame 49, as best shown in Fig. 6. A rod 90 projects through a lug at the free end of the shoe and through a lug on the bracket 89 and this rod runs forwardly to a point below the floor boards 17 of the cab 16. A spring 91 reacts between the lug of the brake shoe 88 and the lug on bracket 89 and lock nuts 92 connected to the rear end of the rod 90, permit adjustment of the rod. The forward end of the rod 90 is pivotally connected to an arm 93 secured to a sleeve 94 through which a shaft 95 extends. A second sleeve 96 is also journaled on the shaft 95, as best shown in Fig. 10. The shaft 95 extends transversely of the truck between the two side members of frame 11 and the two sleeves 94 and 96 are journaled in suitable bearings 97 connected to these side members. An opening 98 is provided in the floor boards 17 above the inner ends of the two sleeves 94 and 96 and a spring pressed dog equipped hand lever 99 connected to the inner end of the sleeve 94 projects upwardly through the opening 98 to a point adjacent the driver's seat of the cab 16. A toothed sector 100 attached to the floor boards 17 cooperates with the dog of the lever 99. Very similar braking mechanism is provided for the winding drum 64, this braking mechanism not being illustrated in detail. The braking mechanism for the winding drum 64 includes a brake drum 101 formed on the drum 64, a brake band 102, a brake shoe 103 and an operating rod 104, which runs forwardly to a point below the opening 98 in the floor boards 17. The rod 104 is pivotally connected at its lower end to a spring pressed dog equipped hand lever 105 fixed to the shaft 95 between the inner ends of the two sleeves 94 and 96, as shown in Fig. 10. The dog of this lever 105 cooperates with a toothed segment 106 attached to the floor boards 17. There is also a braking mechanism provided for the winding drum 66 and this braking mechanism, although not shown in detail, is very similar to the braking mechanism first described. The braking mechanism for the winding drum 66 includes a brake drum 107, formed on the drum 106, a brake band 108 cooperating therewith, a brake shoe 109 for the brake band and an operating rod 110 running forwardly to a point below the sleeve 96. The rod 110 is pivotally connected at its forward end to an arm 111 connected to sleeve 96 and the inner end of the sleeve has connected thereto a spring pressed dog equipped hand lever 102, which projects upwardly through the opening 98 in the floor board 17. A toothed segment 113 is provided for cooperation with the dog of the lever 112.

*Operation*

During the operation of loading the freight carrier 39 onto the truck and unloading the carrier from the truck, it is necessary to independently operate the two drums 61, the drum 64 and the drum 66, and it is desirable during the loading and unloading operations to be able to independently brake these various drums. This can all be done with my triple action power winch. It will, of course, be clear that when the drum shaft 59 is rotated, the two drums 61 will be turned to wind additional portions of the cables 43 thereon. It will also be clear that when the drum 66 is rotated, additional portions of the cable 45 will be wound on this drum. It is equally obvious that when the drum 64 is rotated, additional portions of the cable 47 will be wound on this drum. By manipulation of the hand lever 99, the brake band 87 may be engaged with the brake drum 86 to prevent rotation of the two drums 61 and the drum shaft 59. By operation of the hand lever 112, the brake band 108 may be set against the brake drum 107 to prevent rotation of winding drum 66. By operation of the lever 105, the brake band 102 may be set against the brake drum 101 to prevent rotation of the winding drum 64.

When it is desired to operate the winch, the foot clutch lever 19 may be depressed and the auxiliary gear shift lever 21 may be shifted, whereupon when the lever 19 is released the drive shaft 22 will be driven from the engine in well known manner. This shaft 22 through the sprocket 52, sprocket chain 53, sprocket 54, shaft 55, worm 56 and worm gear 57 will drive the sleeve 58. When it is desired to operate the two winding drums 61, the foot clutch lever 19 will be temporarily depressed and the lever 84 will be swung to its extreme right hand position, so that the dog of the lever is thrown into engagement with the extreme right hand notch of the sector 85. The foot clutch lever 19 may then be released, whereupon the drum shaft 59 and winding drums 61 will be rotated. As the lever 84 is swung from the neutral position shown in Fig. 8, to its extreme right hand position, the shaft 81 will be rocked and the shipper fork 80 will slide the master clutch member 74 to its extreme right hand position, thereby carrying the clutch member 75 into engagement with the clutch member 70. The clutch member 70 will then be locked with the master clutch member 74 to cause the shaft 59 and the drums 61 mounted thereon to rotate with the sleeve 58 upon release of the foot clutch lever 19.

When it is desired to rotate the drum 66 to wind additional quantities of the cable 45 thereon, the lever 84 upon depression of the foot clutch lever 19 will be swung to such position that the dog of the lever engages within the second notch from the right of the sector 85. This will cause the master clutch member 74 to be shifted to a position where the clutch element 76 engages with the clutch element 71 and upon release of the foot clutch lever 19, the drum 66 will be locked into engagement with the master clutch member 74, so as to rotate within the sleeve 58. When it is desired to wind additional quantities of the cable 47 onto the winding drum 64, lever 84 will be swung to its extreme left hand position upon depression of the foot clutch lever 19 and the master clutch member 74 will be slid to its extreme left hand position to throw the clutch element 77 into engagement with the clutch element 72. Then upon release of the foot clutch lever 19, the winding drum 64 will be locked into engagement with the master clutch member 74 and the drum 64 will be rotated with the sleeve 58.

It will be observed that unless the various brakes are applied to the various winding drums, the winding drums are free to turn and quantities of cable may be drawn off the same as desired.

It should perhaps be stated that in loading the freight carrier 39 onto the truck, the cones 44 are first engaged with the hooks 41, whereupon the drums 61 are rotated to wind additional quantities of the cables 43 onto these drums, until such time as the forward ends of the skids 44 are raised above the level of the rollers 33. The drums 61 are then braked by operation of the brake lever 99, whereupon the hook 46 will be engaged with the eye 42 and, if desired, the hook 48 may also be engaged with this eye. The brake drum 66 is then operated to draw additional portions of the cable 45 onto the same and to draw the freight carrier 39 onto the truck, the skids 40 being first received in the tracks 34 and then received in the tracks 24.

In unloading the freight carrier 39 from the truck, the hook 48 having been engaged with the eye 42, the winding drum 64 will be operated to draw additional quantities of the cable 47 onto the same. As this cable 47 runs under the roller 38, and over the rear portion of roller 32, the freight carrier will be slid off the truck as the drum 64 is rotated. When the rear end of the freight carrier has been carried a short distance beyond the end of the tail gate 27, the winding drums 61 and 66, or one of them at least, will be braked by operation of one or both of the levers 99 and 112 and as the drum 64 continues to rotate, the brakes may be eased off to allow the rear end of the freight carrier 39 to drop to the ground or to a platform. Then the truck may be driven forwardly and by further easing off on the brakes for the drums 61 and 66, or, at least, one of these brakes, the forward end of the freight carrier may be dropped.

In loading or unloading the freight carrier 39 from or to a platform higher than the level of the tracks 24, the tail gate 27 will be swung upwardly by operation of the drums 61, the cones 44 engaging between the keepers 37 and the sheaves 36 as the cables 43 are wound up thereby causing the tail gate 27 to swing to upward position. When swung upwardly, the tail gate 27 will be held in this position by applying the brake for the drums 61 through operation of the brake lever 99.

It will be seen that I have provided an extremely compact and efficient triple action winch, which is particularly applicable for use with my freight loading and unloading device, the application for patent on which is above identified. The winch of the present invention is, of course, capable of many other uses than in connection with my freight loading and unloading device.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A triple action power winch comprising in combination, a power drive shaft, a suitably journaled sleeve, means for transmitting power from said power drive shaft to said sleeve, a second shaft projecting through said sleeve but rotatable independently of said sleeve, a first cable winding drum mounted on said second shaft, a second cable winding drum journaled on said second shaft, a third cable winding drum journaled on said sleeve and means for selectively driving said three drums from said sleeve.

2. The structure defined in claim 1, and brakes respectively controlling rotation of respective drums.

3. A triple action power winch for motor driven vehicles comprising in combination, a power shaft driven from the motor of the vehicle, a suitably journaled sleeve extending crosswise of the vehicle, means for transmitting power from said power shaft to said sleeve, a second shaft projecting through said sleeve but independently rotatable respective thereto, a first cable winding drum mounted on said second shaft, a second cable winding drum journaled on said second shaft, a third cable winding drum journaled on said sleeve, and means for selectively independently driving said three drums from said sleeve.

4. A triple action power winch comprising in combination a power drive shaft, a second suitably journaled shaft, a suitably journaled sleeve through which said second shaft extends, means for rotating said sleeve from said power drive shaft, a first cable winding drum fixed on said second shaft, a second cable winding drum journaled on said sleeve, a third cable winding drum journaled on said second shaft, a master clutch having splined sliding connection with said sleeve, means for shifting said clutch longitudinally of said sleeve and clutch elements mounted respectively on said second shaft, said second winding drum and said third winding drum with which said master clutch may be selectively engaged whereby any one of said drums may be selectively rotated.

5. A triple action power winch comprising in combination a power drive shaft, a suitably journaled sleeve, means for driving said sleeve from said drive shaft, a second shaft extending through said sleeve, a first cable winding drum secured to said second shaft, a second cable winding drum journaled on said second shaft, a third cable winding drum journaled on said sleeve, a master clutch member mounted on said sleeve between said second and third drums but slidable longitudinally of said sleeve, means for sliding said clutch member, said clutch member carrying three clutch elements, a clutch element mounted on said second shaft and exclusively engageable with one of the clutch elements of said clutch member when said member is slid to one position, a clutch element on said second drum and exclusively engageable with another of the clutch elements of said member when said member is slid to a second position and another clutch element mounted on said third drum and exclusively engageable with the remaining clutch element of said member when said member is slid to a third position.

6. The structure defined in claim 5, and independently operable brakes for the respective drums.

7. A triple action power winch comprising in combination, a power drive shaft, a suitably journaled sleeve, means for driving said sleeve from said drive shaft, a drum shaft extending through said sleeve and projecting beyond the ends of the same, a first cable winding drum mounted on said drum shaft, a second cable winding drum journaled on said drum shaft, a third cable winding drum journaled on said sleeve, a clutch member splined for sliding movement on said sleeve between said second and third drums, said second drum being recessed at one side thereof and having a clutch element formed on said recessed portion, a clutch element fixed to said drum shaft and received within said recess, a clutch element formed on said third drum, said member having a clutch element formed on one face thereof for engagement with said clutch element on said drum shaft when said member is shifted to one position, said member having another clutch element engageable with said clutch element on said second drum when said member is shifted to a second position and said member having a third clutch element engageable with the clutch element on said third drum when said member is shifted to a third position, said member being shiftable to a central fourth position where none of its clutch elements engage, and means for shifting said member.

8. A triple action power winch comprising in combination a power drive shaft, a first suitably journaled rotatable member, means for transmitting power from said power drive shaft to said first rotatable member, a second rotatable member adjacent but rotatable independently of said first member, a first cable winding drum mounted on said second member, a second cable winding drum journaled on one of said members, a third cable winding drum journaled on one of said members and means for selectively driving said three drums from said first member.

9. A triple action power winch comprising in combination a power drive shaft, a first suitably journaled rotatable member, means for transmitting power from said power drive shaft to said first rotatable member, a second rotatable member adjacent but rotatable independently of said first member, a first cable winding drum mounted on said second member, a second cable winding drum journaled on one of said members, a third cable winding drum journaled on one of said members, means for selectively driving said three drums from said first member, and independently operable brakes for the respective drums.

10. A triple action power winch comprising in combination a power drive shaft, a suitably journaled sleeve member, means for transmitting power from said power drive shaft to said sleeve member, a shaft member projecting through said sleeve member but rotatable independently of said sleeve member, a first cable winding drum mounted on said shaft member, a second cable winding drum journaled on one of said members, a third cable winding drum journaled on one of said members and means for selectively driving said three drums from said sleeve member.

VINCENT T. WREN.